(12) United States Patent
Wimmer

(10) Patent No.: US 8,662,577 B2
(45) Date of Patent: Mar. 4, 2014

(54) SUN ROOF WIND DEFLECTOR AND THE PRODUCTION THEREOF

(75) Inventor: Rudolf Wimmer, Germering (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 13/516,084

(22) PCT Filed: Sep. 22, 2011

(86) PCT No.: PCT/EP2011/066536
§ 371 (c)(1),
(2), (4) Date: Jun. 28, 2012

(87) PCT Pub. No.: WO2012/052247
PCT Pub. Date: Apr. 26, 2012

(65) Prior Publication Data
US 2013/0193721 A1    Aug. 1, 2013

(30) Foreign Application Priority Data
Oct. 20, 2010   (DE) .......................... 10 2010 048 964

(51) Int. Cl.
*B60J 7/043*     (2006.01)

(52) U.S. Cl.
USPC ........................................................ 296/217

(58) Field of Classification Search
USPC ............... 296/217, 180.1, 180.2, 220.01, 91, 296/180.5, 216.03, 222, 223; 15/250.43, 15/250.201, 250.32; 136/244, 251; 454/129

See application file for complete search history.

(56) References Cited

U.S. PATENT DOCUMENTS

| 3,768,854 | A | * | 10/1973 | Johnson et al. | 296/180.3 |
|---|---|---|---|---|---|
| 4,026,595 | A | * | 5/1977 | Jacks | 296/180.3 |
| 4,079,984 | A | * | 3/1978 | Powell | 296/180.3 |
| 4,084,846 | A | * | 4/1978 | Wiley et al. | 296/180.3 |
| 4,141,580 | A | * | 2/1979 | Ivan | 296/180.2 |
| 4,264,099 | A | * | 4/1981 | Pierce | 296/180.2 |
| 4,268,085 | A | * | 5/1981 | Sakai et al. | 296/217 |
| 4,362,332 | A | * | 12/1982 | Garnham | 296/217 |
| 4,396,224 | A | * | 8/1983 | Hayakawa | 296/217 |
| 4,646,770 | A | * | 3/1987 | Lobato | 135/137 |
| 4,929,013 | A | * | 5/1990 | Eke | 296/91 |
| 4,934,754 | A | * | 6/1990 | Cioffi | 296/217 |
| 6,039,390 | A | * | 3/2000 | Agrawal et al. | 296/211 |

(Continued)

FOREIGN PATENT DOCUMENTS

| DE | 10210142 A1 | 9/2003 |
|---|---|---|
| DE | 102005054186 A1 | 5/2007 |

(Continued)

OTHER PUBLICATIONS

International Search Report for PCT/EP2011/066536 dated Aug. 2, 2012.

*Primary Examiner* — Kiran B Patel
(74) *Attorney, Agent, or Firm* — Marshall, Gerstein & Borun LLP

(57) ABSTRACT

A wind deflector for a vehicle roof which may be opened, having a displaceable cover element, comprising a stretchable deflector element made from a flat, flexible material and which with its lower edge region is fastened to a fixed roof portion via a lower edge strip and with its upper edge region is fastened to a pivotable extending clip via an upper edge strip. The upper edge strip and the lower edge strip are components of a peripheral plastics edge encapsulation of the deflector element.

11 Claims, 11 Drawing Sheets

(56) References Cited

U.S. PATENT DOCUMENTS

| | | | |
|---|---|---|---|
| 6,493,128 B1* | 12/2002 | Agrawal et al. | 359/265 |
| 6,666,503 B1* | 12/2003 | Sorensen | 296/217 |
| 6,834,914 B2* | 12/2004 | Bohm et al. | 296/217 |
| 7,059,668 B2* | 6/2006 | Van De Putten et al. | 296/217 |
| 7,413,238 B2* | 8/2008 | Pocchiola | 296/180.2 |
| 7,467,822 B2* | 12/2008 | Manders | 296/217 |
| 7,837,258 B2 | 11/2010 | Bergmiller | |
| 8,267,465 B2* | 9/2012 | Wetzels et al. | 296/180.1 |
| 2002/0033620 A1* | 3/2002 | Munsters et al. | 296/217 |
| 2003/0038512 A1* | 2/2003 | Farber et al. | 296/217 |
| 2007/0236052 A1* | 10/2007 | Biewer et al. | 296/217 |
| 2008/0067839 A1* | 3/2008 | Staltmayer | 296/217 |
| 2008/0129088 A1* | 6/2008 | Spickermann et al. | 296/217 |
| 2008/0246306 A1 | 10/2008 | Oerke et al. | |
| 2009/0001774 A1* | 1/2009 | Hahn et al. | 296/217 |
| 2009/0309393 A1* | 12/2009 | Pihale et al. | 296/217 |
| 2010/0231008 A1* | 9/2010 | Bergmiller | 296/217 |
| 2010/0283294 A1* | 11/2010 | Gundogdu | 296/217 |
| 2011/0260505 A1* | 10/2011 | Rooijakkers | 296/217 |
| 2011/0285180 A1* | 11/2011 | Kohout et al. | 296/217 |
| 2012/0299336 A1* | 11/2012 | Lin | 296/217 |
| 2013/0032208 A1* | 2/2013 | Walz et al. | 136/259 |
| 2013/0161982 A1* | 6/2013 | Walter et al. | 296/217 |
| 2013/0175830 A1* | 7/2013 | Boywitt et al. | 296/217 |

FOREIGN PATENT DOCUMENTS

| | | |
|---|---|---|
| DE | 102005054187 A1 | 5/2007 |
| DE | 102006012644 A1 | 7/2007 |
| DE | 102006043275 B3 | 1/2008 |
| DE | 102009021150 A1 | 11/2010 |
| EP | 1342600 A2 | 9/2003 |
| JP | 2009-515748 A | 4/2009 |
| JP | 2009-522145 A | 6/2009 |

* cited by examiner

SUN ROOF WIND DEFLECTOR AND THE PRODUCTION THEREOF

BACKGROUND OF THE INVENTION

1. Field of the Invention

The invention relates to a wind deflector for a vehicle roof which may be opened, as well as a method for the production thereof.

2. Related Technology

Such a wind deflector is known from practical experience and is used in a vehicle roof which may be opened and which has a displaceable cover element. The wind deflector is arranged in a front edge region of a roof opening, which may be selectively closed or at least partially opened by means of the cover element. The wind deflector may comprise a stretchable mesh as a deflector element, which on its lower edge is attached fixedly to the roof via a lower edge strip, and on its upper edge is attached to an extending clip via an upper edge strip, said extending clip being able to be of U-shaped configuration and with its free limbs, which in each case form a so-called extension arm, being pivotably articulated in the region of one respective guide rail fixed to the roof. The extending clip is able to be pivoted, depending on the open position of the cover element, between a pushed-down resting position in which the deflector element is folded, and an extended operating position in which the mesh-like deflector element is stretched and forms a flow surface. The edge strips of previous deflector elements were stitched on which is time-consuming and thus results in high production costs. Alternatively, it is known to injection-mold a wind deflector mesh directly onto a wind deflector clip. This, however, requires a high degree of complexity of the injection-molding tool used which in turn leads to high tooling costs.

Furthermore, in existing wind deflector mesh, the mesh is prevented from being torn by a rolled seam or a seam being produced on the edge. This is also associated with a time-consuming production step.

SUMMARY OF THE INVENTION

The object of the invention is to provide a wind deflector of the type mentioned in the introduction, which is characterized by low production costs and at the same time is characterized by sufficient protection from tearing.

According to the invention, therefore, a wind deflector for a vehicle roof which may be opened is proposed, said wind deflector having a displaceable cover element which comprises a stretchable deflector element made from a flat, flexible material and which with its lower edge region is fastened to a fixed roof portion via a lower edge strip and with its upper edge region is fastened to a pivotable extending clip via an upper edge strip. The upper edge strip and the lower edge strip are components of a peripheral plastic edge encapsulation which, in particular, may extend over the entire periphery.

The essence of the invention is that the deflector element which is formed from a flexible, flat material and, in particular, from a plastics mesh, is provided in an injection-molding tool all around its edge by a plastic encapsulation, so that the edges of the deflector element are protected from tearing. Moreover, the plastic edge encapsulation of the deflector element provides the possibility of attaching the deflector element to an extending clip and to a fixed roof portion as the edge strips serving for the attachment are an integral component of the edge encapsulation. At the same time, the deflector element is protected against lateral tearing by the encapsulation which extends over the entire periphery.

In a specific embodiment of the wind deflector according to the invention, the edge encapsulation is configured as a multi-component injection-molding element, wherein a first material component is arranged in first portions of the edge encapsulation and a second material component is arranged in second portions of the edge encapsulation. Preferably, the material components have variable hardness and/or elasticity. In particular, a hard plastics material component may be provided in the region of the edge strips, whereas in the regions which have to be deformed during mounting or even when extending the wind deflector, a material component with lower hardness and/or higher elasticity may be formed.

In order to be able to attach the deflector element without further additional parts to the deflector clip and/or the fixed roof portion, the edge encapsulation preferably comprises latching elements, by means of which the attachment may be carried out.

For example, the latching elements are configured integrally on the deflector element. Alternatively, it is also conceivable for the latching elements to be configured as inserts of the edge encapsulation.

The latching elements may be configured in many different ways. Thus, for example, at least one of the edge strips, in particular on a side remote from the flow side of the deflector element, comprises latching lugs which in each case engage in a recess of the extending clip or the fixed roof portion. Also, at least one of the edge strips may comprise integrally formed spring tabs, which also engage in corresponding recesses of the extending clip or the fixed roof portion.

Moreover, for fixing the deflector element it may be advantageous if the portion of the edge encapsulation of the deflector element forming the upper edge strip and/or the lower edge strip has at least partially a fir tree-shaped cross section which engages in a corresponding groove on the extending clip or on the fixed roof portion. Such a fir tree-shaped cross section reliably secures the relevant edge strip portion in the respective groove.

Alternatively or additionally, the deflector element and/or the edge encapsulation thereof may also be screwed or welded to the deflector clip and/or the fixed roof portion. The welded connection may be implemented by means of an ultrasound welding method.

Conventionally, the deflector element comprises a flow portion extending at least approximately in the vehicle transverse direction and to which on both sides an end portion is adjoined in each case, said end portion being curved relative to the flow portion in the direction of a vertical longitudinal central plane of the vehicle and extending in the vehicle longitudinal direction.

In a specific embodiment of the wind deflector according to the invention, the fir tree-shaped cross section of the edge encapsulation is provided in portions of the lower edge strip which define the end portions of the deflector element at the bottom.

In order to stabilize the deflector element further, reinforcing strips may branch off from the edge encapsulation in an integral manner, said reinforcing strips reinforcing the deflector element in the regions thereof spaced apart from the edge. The reinforcing strips may be arranged on one side or even on both sides of the deflector element.

Moreover, reinforcing strips may also be injection-molded on the deflector element, said reinforcing strips not being connected to the edge encapsulation.

The subject-matter of the invention is also a method for producing the wind deflector. Said method comprises the following steps:

inserting a flat, stretchable deflector element into an injection-molding tool, so that the deflector element has a planar arrangement and is arranged with its entire peripheral edge inside an at least approximately frame-like mold cavity;

injection-molding at least one plastics material component into the mold cavity, so that an edge encapsulation of the deflector element is formed, extending entirely around the periphery;

removing the deflector element provided with the edge encapsulation from the mold; and attaching the deflector element to a pivotable extending clip and a fixed roof portion of the vehicle.

Due to the planar arrangement of the deflector element in the injection-molding tool, the insertion step takes place in a very simple manner. The deflector element does not have to be guided along curves or the like which could lead to the formation of folds.

The edge encapsulation in a central injection-molding region of the deflector element is preferably formed from a hard plastics component, whereas the edge encapsulation in the lateral end regions of the deflector element is formed from a soft plastics component, which has a greater flexibility than the hard plastics component.

When attaching the deflector element to the extending clip, the deflector element produced as a planar component is bent in deflector element end portions arranged on both sides in the direction of a longitudinal central plane of the wind deflector to form a deflector element which is approximately U-shaped in plan view, so that it is deformed from a two-dimensional shape into a three-dimensional shape.

Moreover, when injection-molding the at least one tool component in the mold cavity, at least one reinforcing strip is formed, said reinforcing strip branching off from the edge encapsulation and encompassing and/or penetrating the deflector element in regions spaced apart from the edge.

Polypropylene (PP), optionally with a fiber component of for example 60%, TFE and/or TPV, optionally also with a fiber component, may be used as material for the plastic edge encapsulation.

BRIEF DESCRIPTION OF THE DRAWINGS

Further advantages and advantageous embodiments of the subject of the invention may be derived from the description, the drawings and the claims.

An exemplary embodiment of a wind deflector according to the invention is shown schematically in simplified form in the drawings, and is described in more detail in the following description, in which.

DETAILED DESCRIPTION

Figure 1:
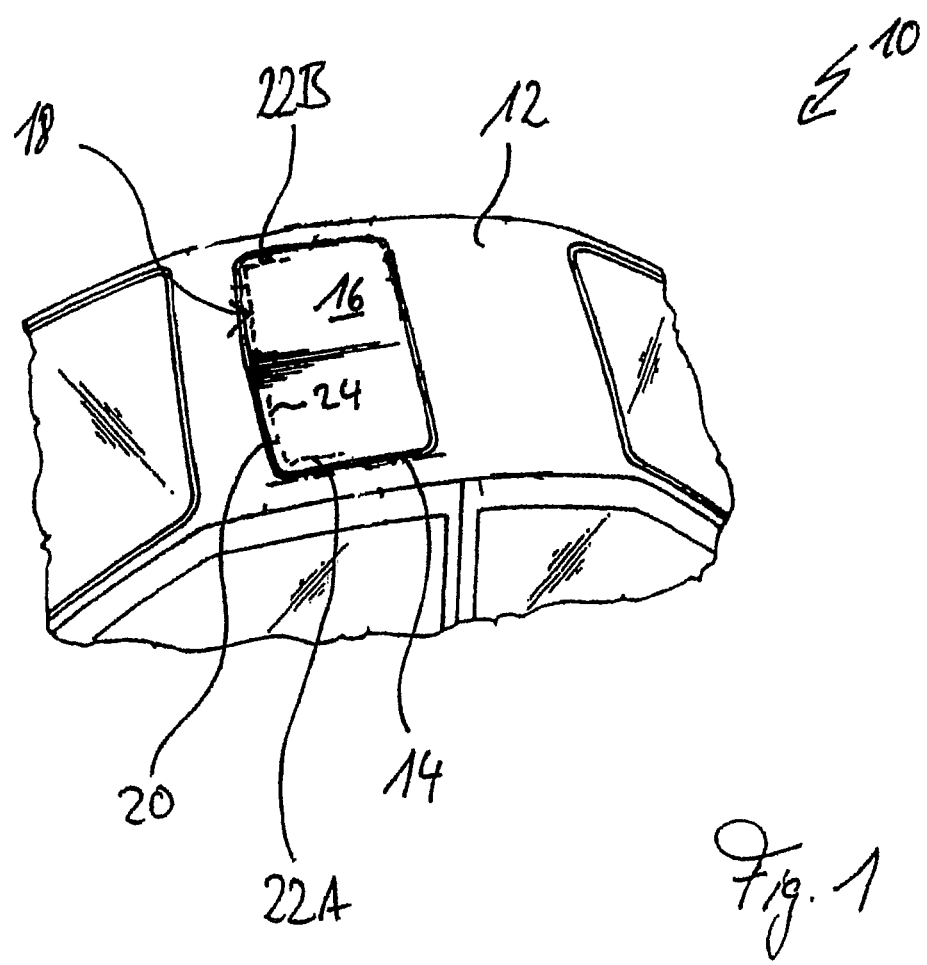
FIG. 1 shows a perspective view of a vehicle roof with a wind deflector conFigured according to the invention.
Figure 2:
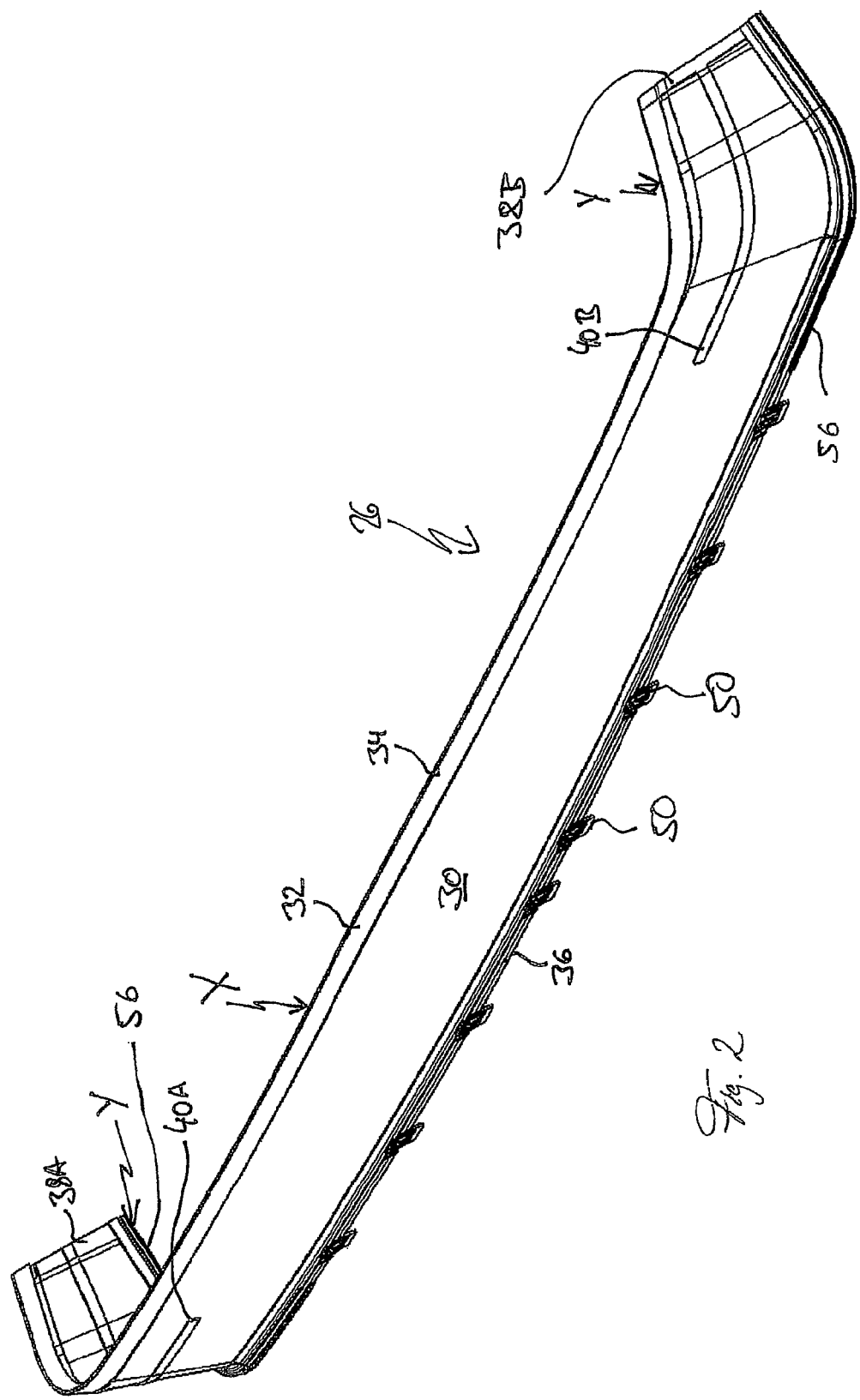
FIG. 2 shows a perspective view of a wind deflector element of the wind deflector.
Figure 3:
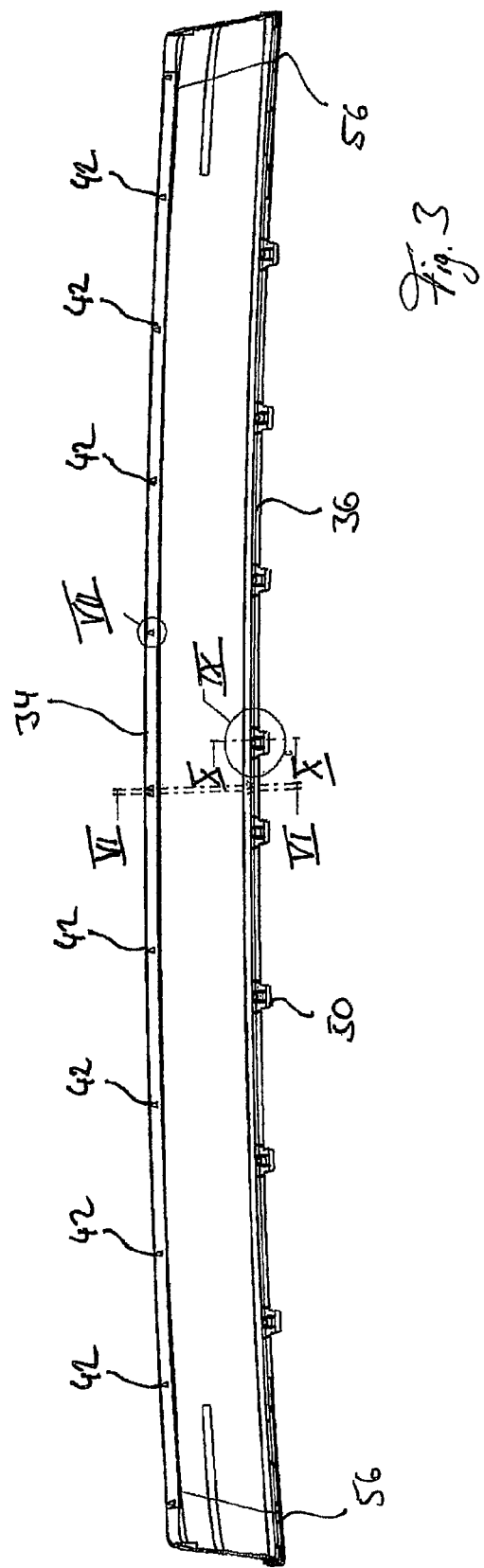
FIG. 3 shows a rear view of the wind deflector element.
Figure 4:
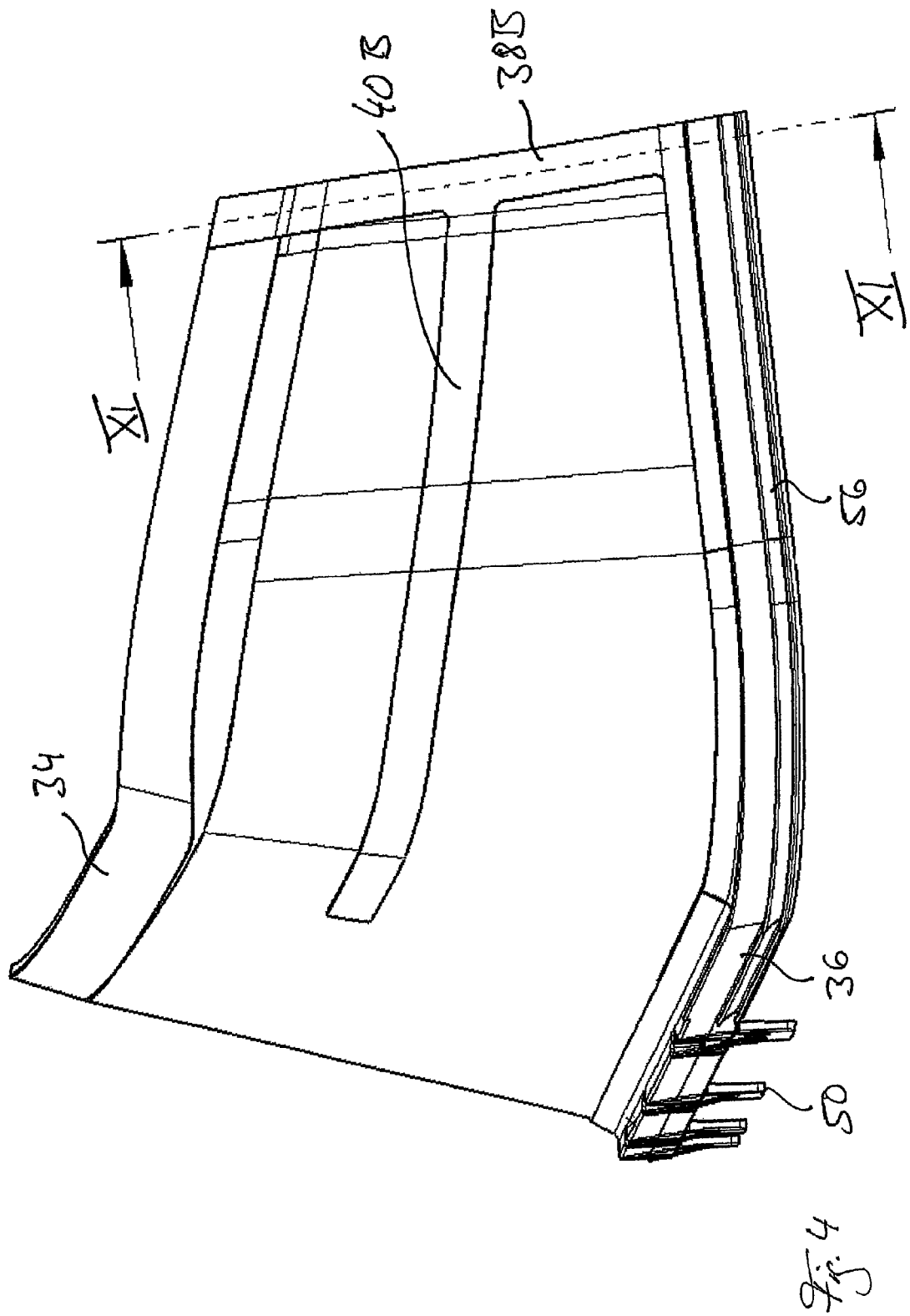
FIG. 4 shows a side view of the wind deflector element.
Figure 5:
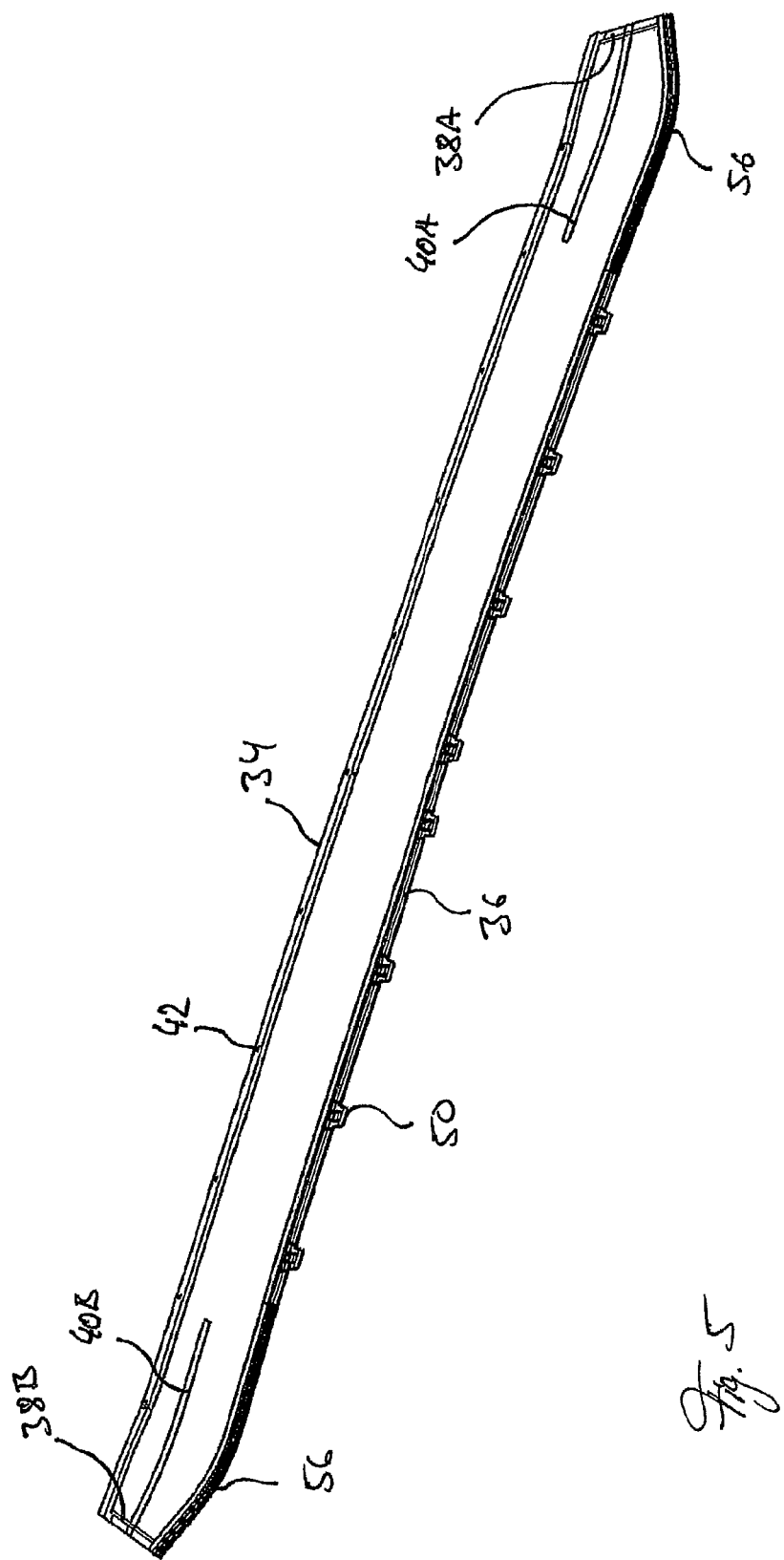
FIG. 5 shows the wind deflector element.

In FIG. 1 a motor vehicle 10 is shown, said motor vehicle comprising a vehicle roof 12 which is provided with a roof cut-out 14 which may be selectively closed or at least partially opened by means of a displaceable cover element 16.

A wind deflector 18 which may be extended, depending on the degree of opening of the cover element 16, is arranged adjacent to a front edge region of the roof cut-out 14, and which is described in detail with reference to FIGS. 2 to 11 and extends substantially in the vehicle transverse direction. The wind deflector serves to prevent the creation of any disturbing air flows and air turbulence in the vehicle interior when the roof cut-out 14 is open, i.e. when the cover element 16 is moved back.

The wind deflector 18 comprises an extending clip 20 which is at least approximately U-shaped and which comprises two limbs 22A and 22B serving as extension arms which are connected together via a limb 24 extending in the vehicle transverse direction. The extension arms 22A and 22B are in each case pivotably articulated to the vehicle roof in the region of a guide rail for the cover element 16, extending in the vehicle longitudinal direction and not shown in more detail here, and in each case pretensioned, for example by means of an extension spring in the extension direction. The degree of extension of the extension arms 22A and 22B and thus of the extending clip 20 is determined by the position of the cover element 16 in the vehicle longitudinal direction relative to the fixed roof portions adjacent to the roof opening 14. When the roof cut-out 14 is closed, the cover element 16 moves from the rear from an open position toward the extension arms 22A and 22B and presses said extension arms down against the force of the extension springs, i.e. into a resting position. When the cover element 16 is moved back, the extension arms 22A and 22B are released so that they automatically pivot out into an operating position by the action of the extension springs.

Figure 6:
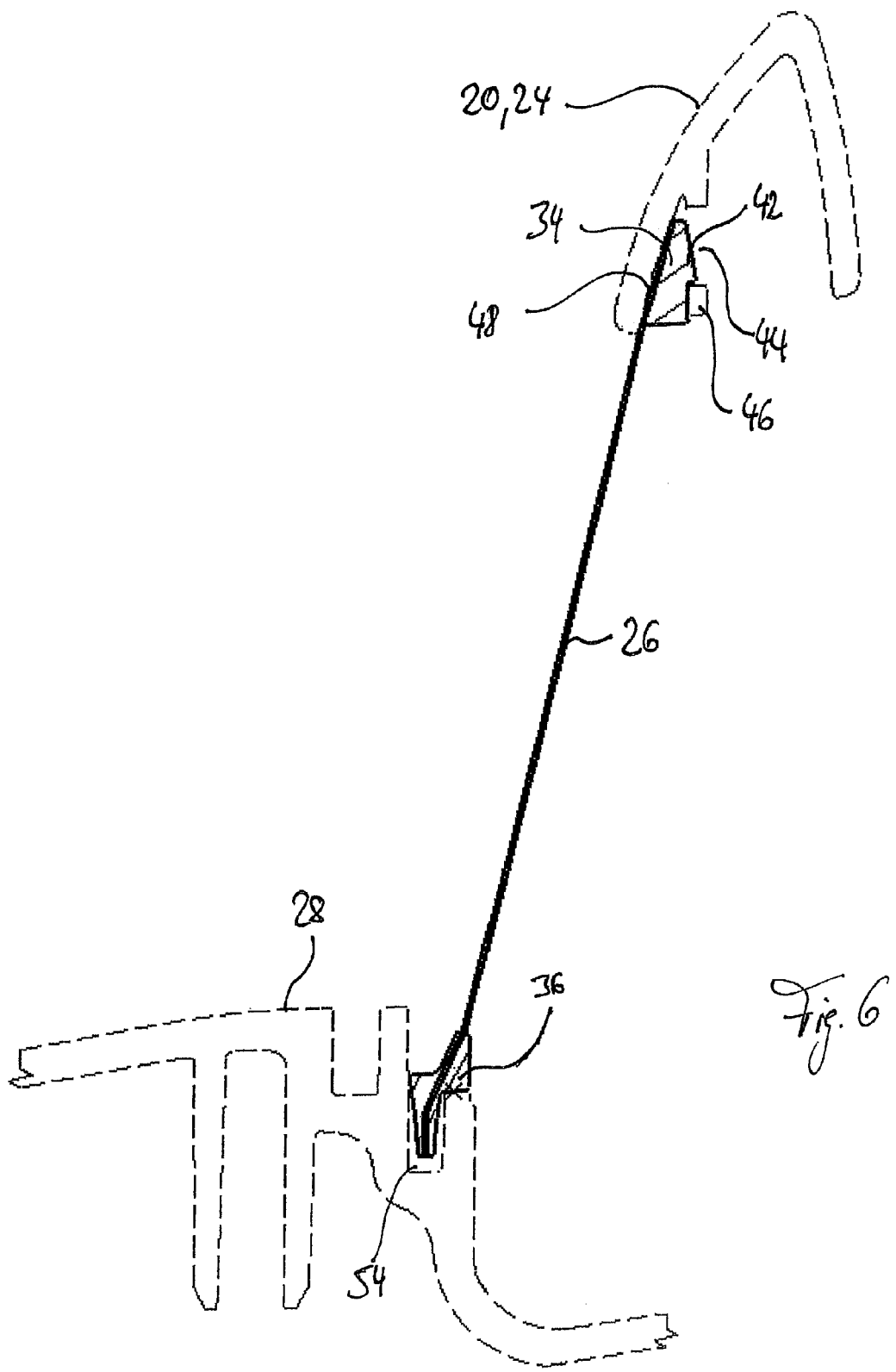
FIG. 6 shows a section through the wind deflector element along the line VI-VI in FIG. 3.
Figure 7:
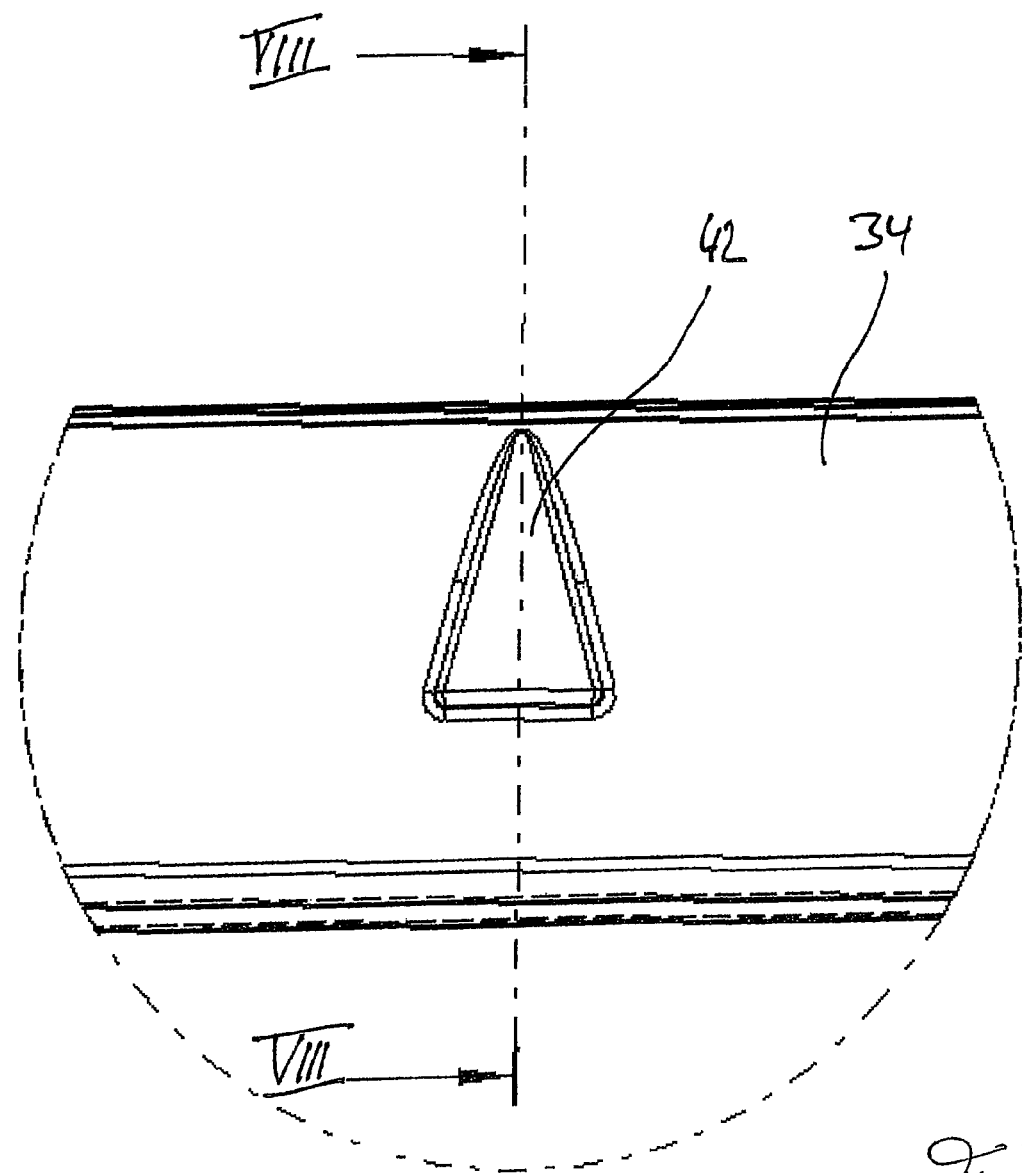
FIG. 7 shows a detailed view of the wind deflector element in the region VII in FIG. 3.
Figure 8:
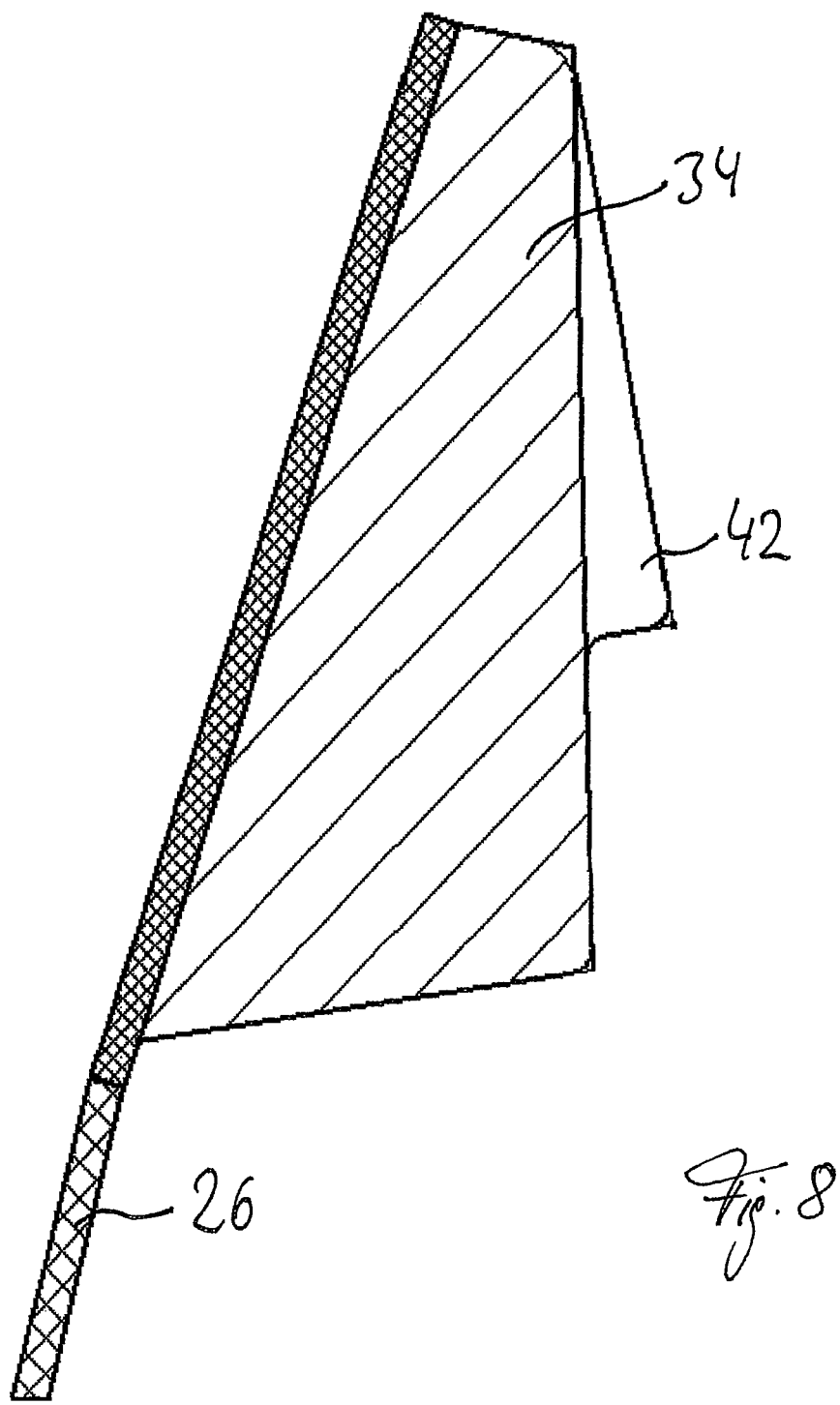
FIG. 8 shows a section through the wind deflector element along the line VIII-VIII in FIG. 7.
Figure 9:
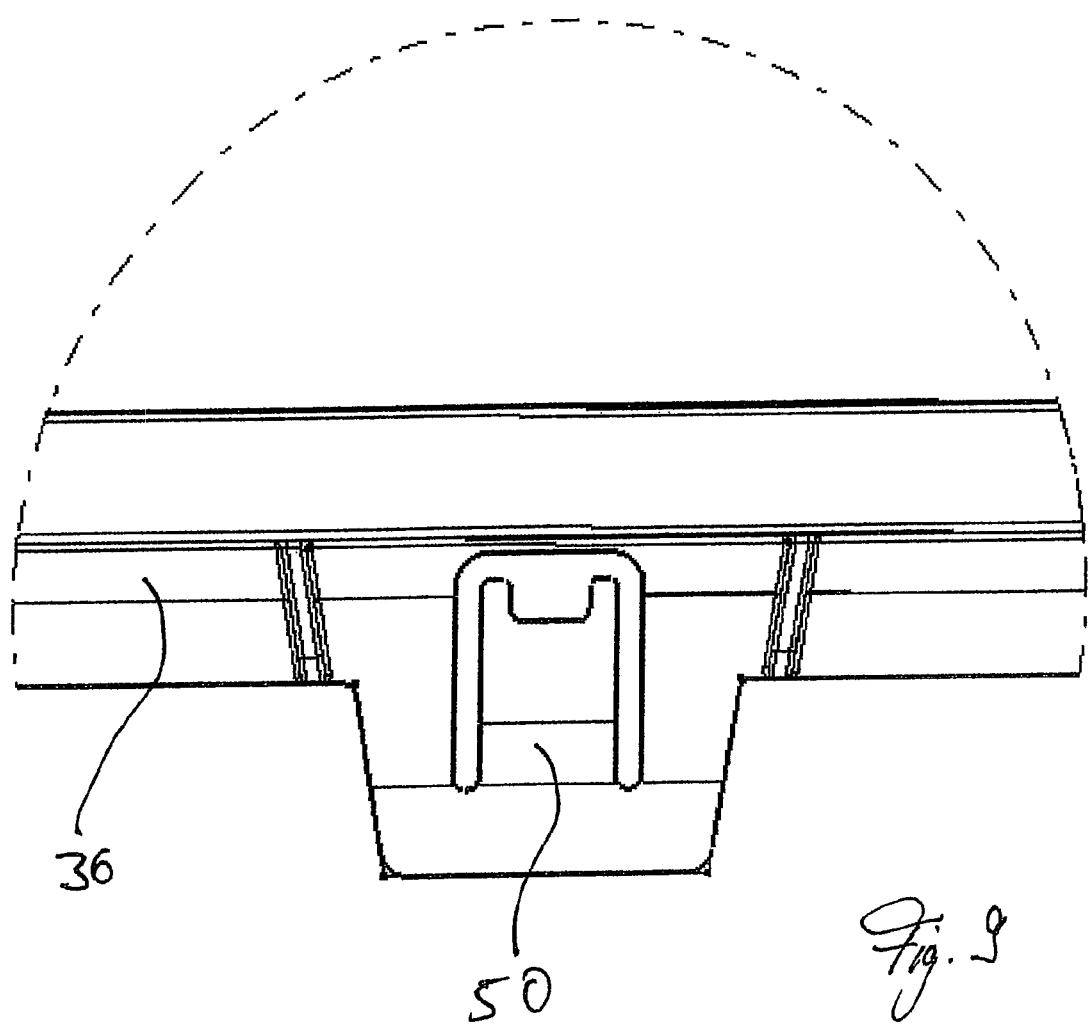
FIG. 9 shows a detailed view of the wind deflector element in the region IX in FIG. 3.
Figure 10:
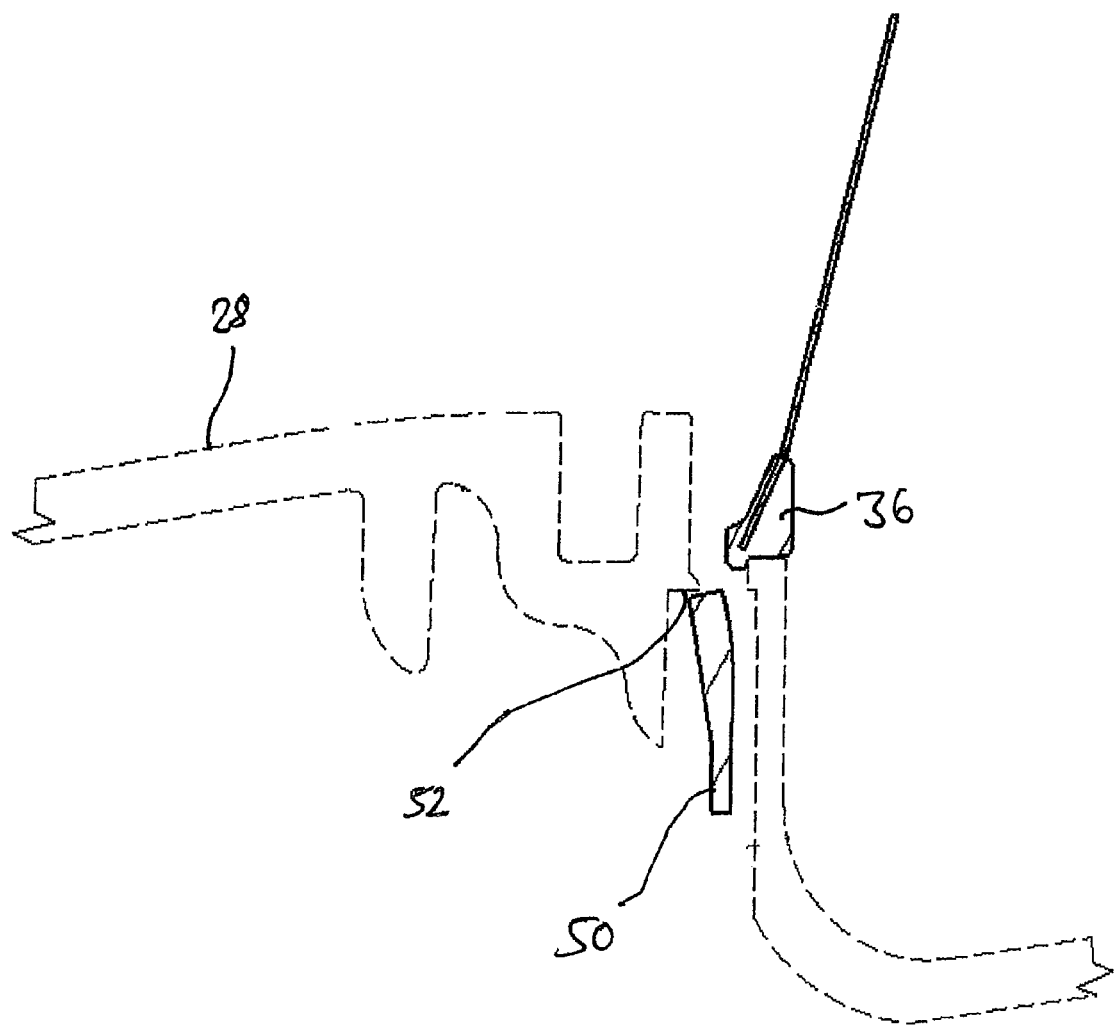
FIG. 10 shows a section through the wind deflector element along the line X-X in FIG. 3.

As may be derived from FIGS. 2 to 11, the wind deflector 18 comprises a mesh-like deflector element 26 which is tensioned between the extending clip 20 and a fixed roof portion 28, which may be seen in FIG. 6 in dashed lines, and is a component of a sun roof frame arranged fixedly on the bodywork. The deflector element 26 configured as mesh is stretched in the extended state of the extending clip 20 between the extending clip 20 and the fixed roof portion 28. In the lowered state of the extending clip 20 the mesh-like deflector element 26 is arranged in folded form between the lowered extending clip 20 and the fixed roof portion 28.

The deflector element 26 is formed from a finely woven mesh 30 made of plastics material, which is provided with a plastics edge encapsulation 32 extending over the entire periphery. The edge encapsulation 32 comprises an upper edge strip 34 which in the mounted state of the wind deflector 18 engages in the extending clip 20, a lower edge strip 36, which in the mounted state of the wind deflector 18 engages in the fixed roof portion 28, as well as lateral limb portions 38A and 38B, which in each case connect together the ends of the upper edge strip 34 and the lower edge strip 36. The edge encapsulation 32 encompasses the edge of the mesh 30 such that the edge of the mesh is effectively prevented from being torn.

The deflector element 26 has in plan view an at least approximately U-shaped form which is subdivided into a flow portion X substantially extending in the vehicle transverse direction and defined by the limbs 24 of the extending clip 20 and two end portions Y adjoining the flow portion X at the side, and which in each case are defined by the relevant lateral limb portion 38A and/or 38B and the relevant extension arms 22A and/or 22B and extend in the vehicle longitudinal direction.

The deflector element 26 also comprises in each case in its end portions Y a reinforcing strip 40A and/or 40B which branches off from the relevant limb portion 38A and/or 38B and extends parallel to the upper edge strip 34 as far as the flow portion X of the deflector element 26. The reinforcing strips 40A and 40B are integral components of the peripheral edge encapsulation 32 of the deflector element 26.

Figure 11:
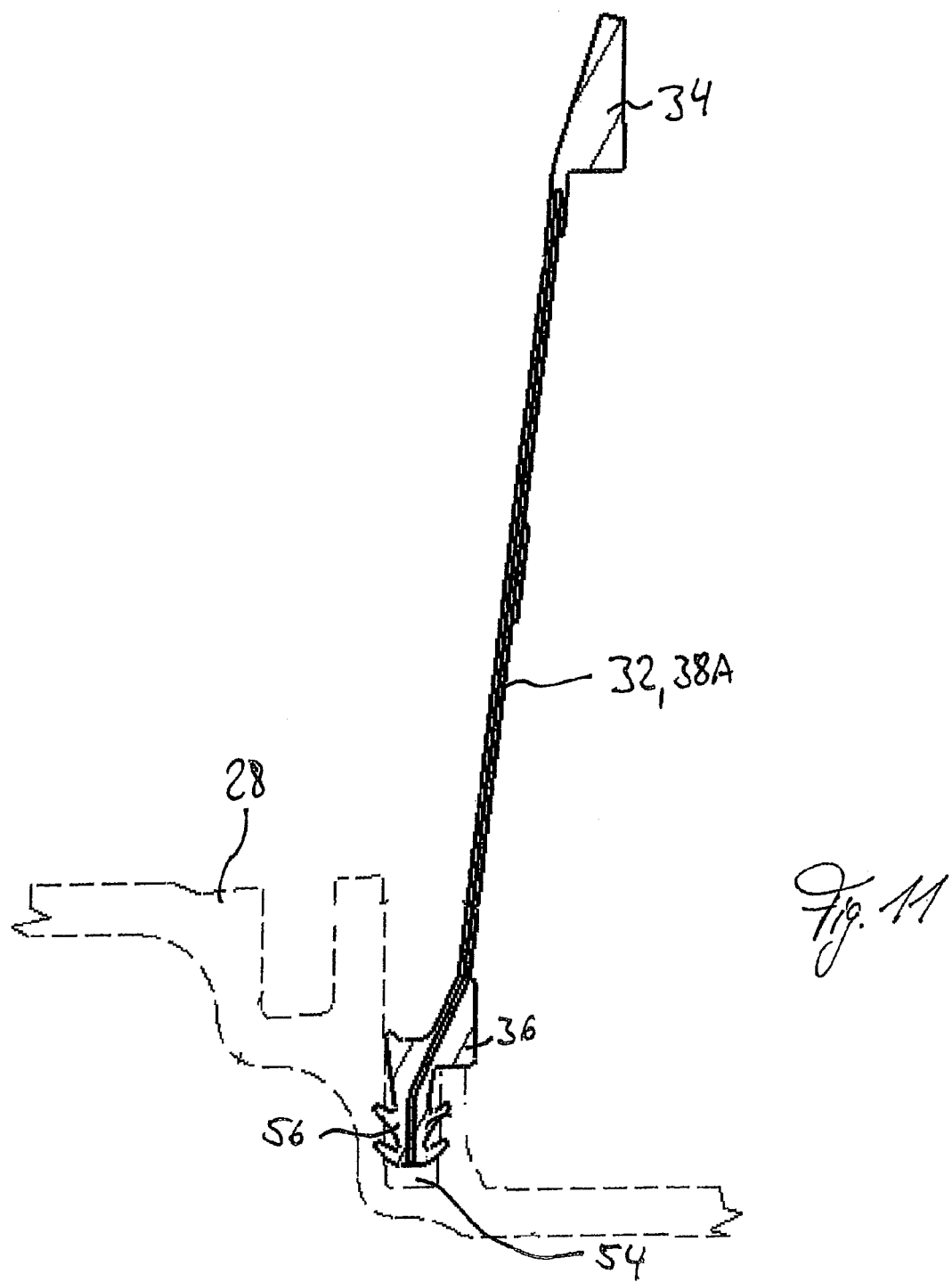
FIG. 11 shows a section through the wind deflector element along the line XI-XI in FIG. 4.

As may be derived, for example, from FIG. 11, the upper edge strip 20 has a substantially wedge-shaped cross section. Latching lugs 42 are formed beyond the extension of the upper edge strip in the vehicle transverse direction, on the surface thereof remote from the flow side, said latching lugs having an approximately triangular bottom surface and in the mounted state in each case engaging in a latching recess 44 of the extending clip 20 and engaging behind a latching projection 46, wherein the upper edge strip 34 engages in a groove 48 of the extending clip 20 on the underside. By means of the latching lugs 42, a secure attachment of the deflector element 26 to the extending clip 20 may be ensured.

The lower edge strip 36 is provided in an integral manner with a plurality of plastic spring tabs 50 which are distributed in the region of the flow portion X in the vehicle transverse direction and which in each case bear against an undercut 52 of the fixed roof portion 26. Moreover, the lower edge strip 36 engages in the region of the flow portion X in a groove 54 of the fixed roof portion 28.

For attaching the end portions Y to the fixed roof portion 28, the lower edge strip 36 has in each case in the end portions Y a fir tree-shaped cross section 56 which is arranged in the extension of the groove 54 so as to be secure from being pulled out.

The plastic edge encapsulation 32 of the deflector element 26 is configured as a multi-component element. The edge strips 34 and 36 are formed in the region of the flow portion X from a hard plastics material, whereas the edge strips 34 and 36 in the curved regions thereof in the vehicle longitudinal direction arranged in the region of the end portions Y, and also the reinforcing strips 40A and 40B, are formed from a soft plastics material which has a greater flexibility than the hard plastics material.

The deflector element 26 is produced such that a mesh blank is inserted in a flat arrangement in a plastics injection-molding tool, so that the edge of the mesh blank is located within a mold cavity and/or a cavity of the injection-molding tool. Then the injection-molding tool is closed so that the plastics material may be injection-molded for forming the edge encapsulation 32 and the reinforcing strips 40A and 40B. After curing, the resulting planar component may be removed from the mold. For attaching to the extending clip 20 and the fixed roof portion 28, the resulting edge strips 34 and 38 are correspondingly bent and latched into the corresponding grooves 48 and 54.

LIST OF REFERENCE NUMERALS

10 Motor vehicle
12 Vehicle roof
14 Roof cut-out
16 Cover element
18 Wind deflector
20 Extending clip
22A, 22B Extension arms
24 Limb
26 Deflector element
28 Fixed roof portion
30 Mesh
32 Edge encapsulation
34 Upper edge strip
36 Lower edge strip
38A, 38B Lateral limb portions
40A, 40B Reinforcing strip
42 Latching lug
44 Latching recess
46 Latching projection
48 Groove
50 Spring tab
52 Undercut
54 Groove
56 Fir tree-shaped cross section

The invention claimed is:

1. A wind deflector for a vehicle roof which may be opened, having a displaceable cover element, comprising:
   a foldable deflector element made from a flat, flexible material and which on a lower edge region thereof is fastened to a fixed roof portion via a lower edge strip and on an upper edge region is fastened to a pivotable extending clip via an upper edge strip;
   wherein the upper edge strip and the lower edge strip are components of a peripheral plastic edge encapsulation of the deflector element, wherein the edge encapsulation extends over the entire periphery of the deflector element.

2. The wind deflector as claimed in claim 1, wherein the edge encapsulation is configured as a multi-component injection-molded element, wherein a first material component is arranged in first portions of the edge encapsulation and a second material component is arranged in second portions of the edge encapsulation.

3. The wind deflector as claimed in claim 1 wherein the edge encapsulation comprises latching elements for attaching the deflector element to the fixed roof portion and/or the pivotable extending clip.

4. The wind deflector as claimed in claim 3, wherein the latching elements are configured integrally on the peripheral edge encapsulation.

5. The wind deflector as claimed in claim 3, wherein the latching elements are configured as inserts of the edge encapsulation.

6. The wind deflector as claimed in claim 3, wherein at least one of the edge strips comprises latching lugs, which in each case engage in a latching recess of the extending clip or the fixed roof portion.

7. The wind deflector as claimed in claim 3, wherein at least one of the edge strips comprises integrally formed spring tabs as latching elements.

8. The wind deflector as claimed in claim 1, wherein the portion of the edge encapsulation of the deflector element forming the upper edge strip and/or the lower edge strip has at least partially a fir tree-shaped cross section which engages in a corresponding groove on the extending clip and/or on the fixed roof portion.

9. The wind deflector as claimed in claim 1, wherein the deflector element comprises a flow portion extending at least approximately in a vehicle transverse direction, and to which on both sides an end portion is adjoined in each case, said end portion being curved relative to the flow portion in the direction of a vertical central plane of the wind deflector.

10. The wind deflector as claimed in claim 8 wherein the fir tree-shaped cross section is formed in portions of the lower edge strip which define the end portions of the deflector element at the bottom.

11. The wind deflector as claimed in claim 1, wherein reinforcing strips branch off from the edge encapsulation in an integral manner, said reinforcing strips reinforcing the deflector element in the regions thereof spaced apart from the edge.

\* \* \* \* \*